(12) United States Patent
Hofstetter et al.

(10) Patent No.: US 9,480,248 B2
(45) Date of Patent: Nov. 1, 2016

(54) USE OF ACOUSTICS TO DISRUPT AND DETER WOOD-INFESTING INSECTS AND OTHER INVERTEBRATES FROM AND WITHIN TREES AND WOOD PRODUCTS

(75) Inventors: Richard W. Hofstetter, Flagstaff, AZ (US); Reagan McGuire, Flagstaff, AZ (US); David Dunn, Sante Fe, NM (US)

(73) Assignee: Arizona Board of Regents, Acting for and on behalf of Northern Arizona University, Flagstaff, AZ (US)

( * ) Notice: Subject to any disclaimer, the term of this patent is extended or adjusted under 35 U.S.C. 154(b) by 463 days.

(21) Appl. No.: 13/992,216

(22) PCT Filed: Dec. 7, 2011

(86) PCT No.: PCT/US2011/063838
§ 371 (c)(1),
(2), (4) Date: Aug. 5, 2014

(87) PCT Pub. No.: WO2012/078814
PCT Pub. Date: Jun. 14, 2012

(65) Prior Publication Data
US 2014/0340996 A1    Nov. 20, 2014

Related U.S. Application Data

(60) Provisional application No. 61/420,715, filed on Dec. 7, 2010.

(51) Int. Cl.
*A01M 29/16* (2011.01)
*A01M 1/22* (2006.01)

(52) U.S. Cl.
CPC .............. *A01M 29/16* (2013.01); *A01M 1/226* (2013.01)

(58) Field of Classification Search
CPC ...... A01M 1/226; A01M 29/16; A01M 1/24; A01M 29/18; A01M 29/22
USPC ........................................................ 367/139
See application file for complete search history.

(56) References Cited

U.S. PATENT DOCUMENTS

| 2,861,132 A | 11/1958 | Kahn et al. |
| 4,284,845 A | 8/1981 | Belcher |

(Continued)

FOREIGN PATENT DOCUMENTS

| JP | SH055-96047 | 7/1980 |
| JP | 2009-527229 | 8/2007 |

(Continued)

OTHER PUBLICATIONS

Giles, J., "Beetle Mania," The Atlantic, [retrieved on Jun. 18, 2013]. Retrieved from the Internet: <URL:http://www.theatlantic.com/magazine/print/2010/01/beetle-mania/307828/>. Entire document.
The International Preliminary Report on Patentability for counterpart International Application No. PCT/US2011/063838, mailed Jan. 30, 2014, 8 pages.
English language summary of Japan Patent Disclosure No. SHO 55-96047.

(Continued)

*Primary Examiner* — Daniel Pihulic
(74) *Attorney, Agent, or Firm* — Fennemore Craig, P.C.

(57) ABSTRACT

The invention comprises a device and method for impacting the behavior of invertebrates that infest wood, without the use of chemicals. In particular, the invention is useful for impacting the behavior of wood-boring invertebrates, which infest wood products, lumber and the woody portions of plants and trees. The invention utilizes acoustic (sonic) agents which may be optionally modulated with specific signals, to cause negative effects on the normal behaviors exhibited by wood-infesting invertebrates, which may result in the invertebrates being injured or killed, unable to reproduce, or caused to flee the wood that the invertebrates are infesting.

27 Claims, 4 Drawing Sheets

(56) References Cited

U.S. PATENT DOCUMENTS

| | | |
|---|---|---|
| 7,541,936 B2 | 6/2009 | Wijenberg et al. |
| 2008/0192578 A1 | 8/2008 | Lee |
| 2009/0303053 A1 | 12/2009 | Evans et al. |
| 2010/0054543 A1 | 3/2010 | Pachys |
| 2012/0167826 A1 | 7/2012 | Takanashi et al. |
| 2014/0340996 A1* | 11/2014 | Hofstetter ............ A01M 1/226 367/139 |

FOREIGN PATENT DOCUMENTS

| | | | |
|---|---|---|---|
| JP | 2011-530850 | 8/2007 | |
| WO | 2005004343 | 1/2005 | |
| WO | WO2007095693 A1 | 8/2007 | |
| WO | WO 2012078814 A3 * | 3/2014 | ............ A01M 1/226 |

OTHER PUBLICATIONS

English translation of Japan Office Action mailed Nov. 24, 2015 in corresponding Japan Patent App. No. 2013-543328.

International Search Report and Written Opinion from the International Searching Authority dated Apr. 19, 2012, for PCT application No. PCT/US2011/063838 filed Dec. 7, 2011.

Dunn, D., The sound of light in trees: the acoustic ecology of pinyon pines, 2001 [retrieved on Mar. 30, 2012]. Retrieved from the Internet: <URL: http://www.acousticecology.org/dunn/solitnotes.html>, entire document.

Pierce, K., "Beware of Asian Longhorn Beetle," News 8, wtnh.com, Aug. 8, 2009. [retrieved on Mar. 30, 2012]. Retrieved from the Internet: <URL: http://www.wtnh.com/dpp/news/new_haven_cty/news_wtnh_conn_beware_of_asian_longhorn_beetle_200908060555>, entire document.

* cited by examiner

USE OF ACOUSTICS TO DISRUPT AND DETER WOOD-INFESTING INSECTS AND OTHER INVERTEBRATES FROM AND WITHIN TREES AND WOOD PRODUCTS

RELATED APPLICATION DATA

This application is a U.S. National Stage of PCT Application No. PCT/US2011/063838 filed on Dec. 7, 2011, which claims priority to U.S. Provisional Patent Application No. 61/420,715 filed on Dec. 7, 2010.

FIELD OF THE INVENTION

The invention relates to minimizing the impact of insects and other invertebrates that damage and/or kill plants and trees and infest wood products, such as bark beetles, termites, carpenter ants, wood wasps, etc. Examples of wood-boring insect are the Emerald Ash Borer, the Asian Longhorn Beetle, and the Mountain Pine Beetle.

BRIEF SUMMARY OF THE INVENTION

The invention comprises a device and method for impacting the behavior of invertebrates that infest wood, without the use of chemicals. In particular, the invention is useful for impacting the behavior of woodboring invertebrates, which infest wood products, lumber and the woody portions of plants and trees. The invention utilizes acoustic (sonic) agents which may be modulated with specific signals, to cause negative effects on the normal behaviors exhibited by wood-infesting invertebrates, which may result in the invertebrates being injured or killed, unable to reproduce, or caused to flee the wood that the invertebrates are infesting. Other uses of the device include using acoustic agents to attract invertebrates such as that in association with a trap, or to attract invertebrates to alternative locations, or to cause invertebrates to avoid flying to certain locations.

BRIEF DESCRIPTION OF THE DRAWINGS

The present invention will now be described in more detail, with reference to preferred embodiments, given by way of examples, and illustrated in the accompanying drawings in which.

DETAILED DESCRIPTION OF THE INVENTION

The device of the invention provides a way to minimize the impact of wood-infesting invertebrates, by subjecting the invertebrates and the immediate woody environment in which they live to certain acoustic (sonic) agents that are modulated with specific signals.

The terms "wood-infesting invertebrates", "target invertebrates", "targeted invertebrates", "target organisms" or "targeted organisms" as used herein are intended to encompass any invertebrate species that uses wood as a food source or that otherwise destroys or bores or burrows into wood for shelter or for reproductive or other purposes. Non-limiting examples of wood-infesting invertebrates include bark beetles, wood wasps, woodborers, termites and barnacles. Specific examples of the foregoing are the Emerald Ash Borer, the Asian Longhorn Beetle, Redbay Ambrosia Beetle, and the Mountain Pine Beetle. The Mountain Pine Beetle has already decimated large portions of coniferous forests across North America, and there is at present no way to effectively prevent its spread. The Emerald Ash Borer is native to Asia and was discovered in North America about a decade ago. It is widely believed by scientists that this organism will infest, and thereby eliminate, all ash trees in North America within the next several decades.

The wood that may be protected using the invention is typically the wood of a live, standing tree, but may also be that of a deceased, standing tree or a wood product such as lumber, fences, furniture, wine barrels, wood pilings, piers, etc. The invention may also be adapted for use in the protection of wood in buildings and other structures.

The wood infesting insects of particular interest for targeting with this invention typically have flying stage in which the adult insect can fly from one tree to another, laying eggs in each tree. The eggs hatch into larvae, which tend to cause significant damage to the tree or wooden object. When the invention is used on a tree, the tree is referred to as the "host tree". Often, the infestation causes the death of the host tree.

The invention is useful for causing negative effects on many of the normal behaviors exhibited by targeted organisms. For example, the invention is useful for disrupting directional guidance, feeding, colonization, tunneling, communication, organization, reproduction, nest building, competitive interactions, predator avoidance, mate attraction, mating, caring for eggs and caring for offspring, and other behaviors of the insects.

When one or more of these normal behaviors are disrupted, there is a great decrease in the ability of an individual organism to reproduce and/or survive.

For example, in an embodiment of the invention, the reproductive capabilities of the organism are compromised, which prevents the organism from successfully reproducing, which in turn has a negative affect on the local population of the organism. In another embodiment, the invention disrupts the colonization or organizational capabilities of a species population, rendering the population unable to carry out all of the behaviors necessary to keep the colony alive and functioning. As a result, in due course, this will result in decline and possibly eventual termination of the local population of target organisms.

The invention can be used to provide individual tree protection to both large scale forests (e.g., government owned public lands such as national and state forest lands), as well as to private landowners and commercial tree growers. This invention provides a non-chemical means for preventing the spread of wood-infesting invertebrates, including the prevention and the control of tree-infesting organisms that occur across all habitats from wildlife refuges to urban centers.

In an embodiment of the invention, the invention has effects on only specific species of target invertebrates because in most situations the target invertebrate is the only threatening wood-boring species within the tree or wood product, whilst having little impact on non-target species. For example, in treating a tree to reduce or eliminate the population of bark beetle, it may be preferable to avoid the reduction or elimination of non-harmful and/or beneficial (non-target) insects and other animals. A way to accomplish this according to the invention is to generate noises relevant to the specific target species. The term "relevant" as used herein means that the target organism will react in some way to the noise. For example, if one is to use the invention to have an effect on Mountain Pine Beetles, in a preferred embodiment of the invention, the natural sounds produced by the Mountain Pine Beetle are subjected to modification as discussed herein, and the Mountain Pine Beetles are then exposed to those modified sounds.

The invention is also designed to have minimal negative effect on the host trees.

The present invention provides a way to significantly reduce and even eliminate wood-infesting invertebrates that are already inside or on the tree or wooden material or object. The invention is also useful for deterring wood-investing insects from boring into the wood, by making the wood undesirable for the insect to land on and/or to remain on the tree. Thus, the invention deters insects from remaining on and boring into the wood.

In a further preferred embodiment, the invention is used to prevent the infestation of trees, by deterring insects in the flying stage from alighting on the tree or wooden object.

The invention is comprised of a device for delivering sound (acoustic) waves to the wood to be treated (typically, to a tree), by physically attaching the device (actually, the device's output transducer(s)) to the object or material to be treated (such as a tree). Thus, the device transmits acoustic signals within both air spaces and woody substrates inside of trees, through mechanical vibratory coupling. The process involves the input of specific and biologically relevant sound patterns (e.g., mating calls, territorial signals, species recognition sounds) into trees, wooden objects and wooden materials, in order to influence the entry, colonization, mating, communication and tunneling behavior of organisms in the tree, object or material. Many of the specific and biologically relevant sound patterns (acoustic signals) used in the invention are derived directly from sounds produced by the target organisms, i.e., are recordings of the organisms' naturally-emitted sounds. These acoustic signals are subsequently reproduced, and in some cases also modified, and the target organism is exposed to the acoustic signals, to trigger and alter their associated behaviors and functioning. (For instance, modifications include, but are not limited to reverberation, ring modulations, flanging, chorusing, etc. are used to change sounds). The sounds that are used do not merely attract or repel the target organisms, but rather in addition or instead, the sounds disrupt the organisms' neural functioning, resulting in changes in one or more important behaviors or metabolic processes of the target organisms. For example, normal functioning may be disrupted by the invention, and may cause aberrant (non-typical) behavior or abnormal development with respect to such important life functions as reproduction, feeding, colonization, tunneling, communication, organization, etc. When one or more of these normal processes are disrupted, the ability of the organisms to survive is greatly decreased.

The device(s) of the invention may be used as a "single tree protection", i.e., used in conjunction with one living tree to provide effective invertebrate control to that tree. It may also be used on dead trees, to prevent spread of the invertebrate to other areas, particularly to living trees.

Alternatively, multiple units of the device, multiple devices or a device with multiple transducers can be used to provide invertebrate control for more than one tree, wooden object or material. The sounds created by the device could potentially be distributed with various broadcast strategies (e.g., through the roots of trees) to protect multiple trees or other wood objects or materials.

The device and method of the invention may be useful for treatment or prevention of wooden objects and materials by transmitting the sounds according to the invention through substrates other than air, such as through water, dirt, sand, air or ice, including through the ground and bodies of water. For example, infestations of wooden piers and boats by barnacles under water may be treated in this way.

In yet another embodiment of the invention, the device and method of the invention may be used to re-direct an outbreak of wood-boring insects or other invertebrates, by creating a buffer zone to deter insects from entering a particular portion of a treed area. For example, a buffer zone may be created by placing at least one device on each of multiple trees in an area. Similarly, a buffer zone could be created to deter invertebrates from entering an area containing wooden objects or materials to be protected.

The device of the invention could be used on object comprised partially or totally of wood, such as wooden building structures (e.g., houses) and wooden wine barrels and casks, as well as on portions of objects that are comprised of wood.

There are three general types of acoustic signals that are used in the device and method of the invention, as follows: biological acoustic waveform samples, re-synthesized biological acoustic waveform samples, and chaotic acoustic waveforms.

Each of these signals may be used alone, or two or more may be used together.

Each of these signals may optionally be subjected to processing digitally in both time domain and frequency domain. For example, standard audio signal processing effects may be used. Examples of types of processing include, but are not limited to, the following: decreasing duration of biological waveform sample or portion thereof without changing its speed, increasing duration of biological waveform sample or portion thereof without changing its speed, increasing amplitude of biological waveform sample or portion thereof, decreasing amplitude of biological waveform sample or portion thereof, deleting a part of the biological waveform sample or portion thereof, repeating a part of the biological waveform sample or portion thereof, inserting an artificially generated waveform sample or portion thereof to overlap all or a portion of the biological waveform sample or portion thereof, and inserting an artificially generated waveform sample or portion thereof in front of or following the biological waveform sample or portion thereof.

Portions of the biological acoustic waveform samples, as well as portions of the re-synthesized acoustic waveform samples and of the chaotic acoustic waveforms may be used, instead of or in addition to the entire waveforms.

The term "biological acoustic waveform samples" is known to those of ordinary skill in the art, and refers to the "natural" or native, endemic sounds emitted by insects that are intended to be affected by the invention. These are typically recorded digitally, but may also be recorded in analog.

The term "re-synthesized biological acoustic waveform samples" is known in the art to refer to biological acoustic waveform samples which have been modified in certain ways. One example of the numerous ways that the biological waveform samples may be re-synthesized is by simplifying the samples to their most basic components, essentially distilling out the most biologically relevant portion of the sample.

Chaotic oscillators are used to produce sounds that are highly unpredictable, and therefore sounds will keep changing in complex ways to avoid any possible habituation effect. Habituation effect occurs when an organism becomes accustomed to a particular stimulus, such as in this case, auditory stimulus, and as a result exhibits a decreased response to the stimulus.

Figure 1:
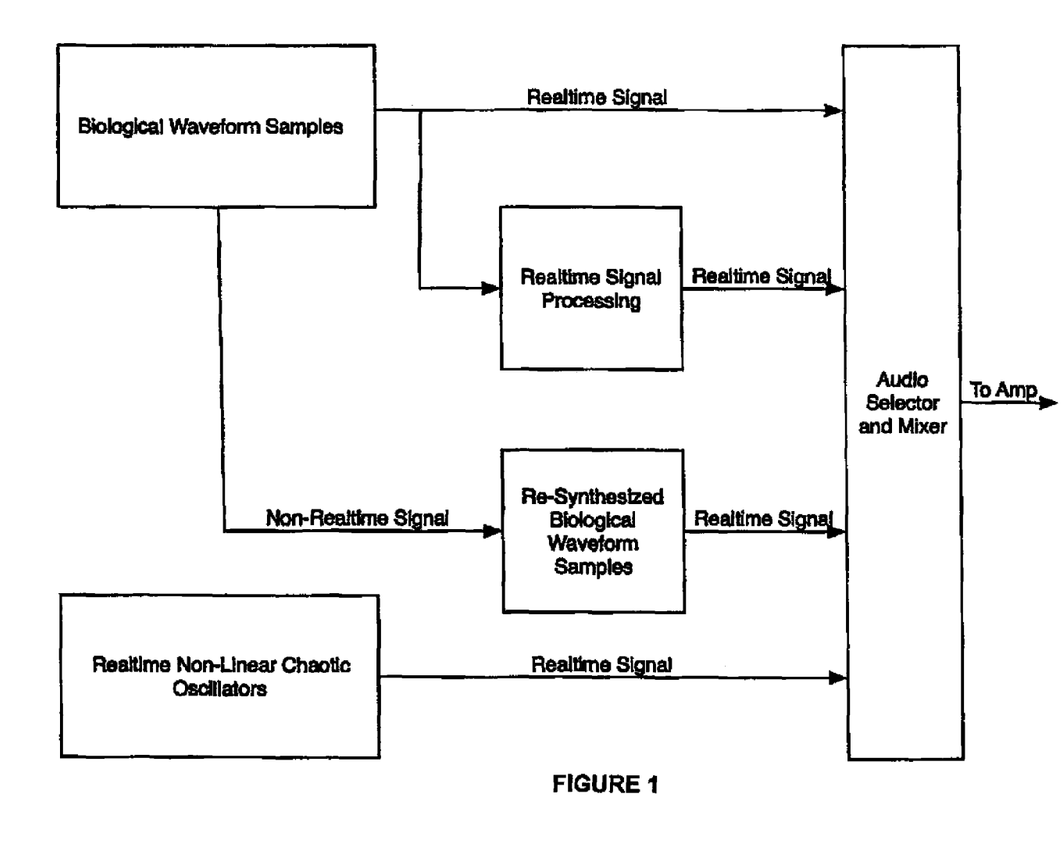
FIG. 1 is a flowchart providing the overall structure of the process according to the invention.

Shown in FIG. 1 is an overall flowchart of the system of the invention.

These processes are to be divided between digital software implementation to run on a standard laptop or netbook computer and analog circuits housed in a separate instrumentation box, although variations on the foregoing are within the scope of the invention.

In a specific, non-limiting embodiment of the invention, a combination of two or more of the following types of sonic agents also referred to herein as "acoustic signals" are employed: (1) one or more specifically targeted sounds (acoustic signals) of biological origins such as mating calls, aggression calls, and sounds emitted in conjunction with chemical signals (e.g., biological wave form samples or portions thereof, or re-synthesize/biological waveform samples or portions thereof); (2) the aforementioned sounds subjected to a variety of signal processing effects (i.e., altering the nature of the audio wave form through changes in the frequency and amplitude domains of the wave form); and (3) sounds of synthetic origins that mask or confuse the normal sonic behaviors and communications between the organisms (e.g., chaotic waveforms).

In order to determine which initial sounds (auditory stimuli) should be generated to expose the target organism to, the user must first determine the range (frequency) of sound that the organism emits.

The user must then examine the patterns of sound(s) emitted by the organism. For example, if the target organism is an insect, the patterns include the rhythm of the beats or strides or rubbing of the organism's parts against one another (also called "stridulations"), such as the rubbing of the organism's wings against its abdomen.

An important aspect of one embodiment of the invention is to generate sounds that match the frequency and patterns that the organism naturally emits or is otherwise exposed to (such as a predator's calls). This is important because the sounds generated must be "relevant" to the organism, i.e., the organism must recognize the frequency and pattern of sound generated by the device of the invention, if the generated auditory stimulus is to have an effect on the organism's behavior.

The invention further involves exposing the organism to the generated sounds, and observing how the organism responds. The generated sounds are modified, and the organism's response(s) to the modified sounds is observed.

The observer may then choose generated sounds which cause the organism to exhibit desirable behavior. The term "desirable behavior" is intended to mean any behavior by the organism that is deemed to be desirable to humans, such as cessation of or causing erratic life function behaviors (reproduction, feeding, colonization, tunneling, communication, organization).

The invention further involves taking steps to avoid habituation to a particular generated noise. To avoid habituation, the generated noise is preferably chaotic, meaning that the length of the noises and the time in between the noises is changed periodically so that that the organism is not exposed to a constant certain pattern.

In another embodiment of the invention, the organism may be exposed to a generation of the "natural" noise emitted by the organism, with an additional chaotic noise played at the same time as (on top of) the natural noise.

In still yet another embodiment of the invention, the target organism is exposed for a continuous time to a certain natural noise normally emitted by the organism or to which the organism is exposed to in nature (e.g., predators), in order to cause the organism to habituate to the noise. For example, organisms (particularly, but not necessarily, young ones in the larvae stage) are exposed continuously to the mating call of the organism, causing the organism to habituate to the mating call. Even after the artificially generated noise is removed, the organism has become habituated to the mating call, and will not respond to it. If the organism fails to respond to the mating call, it will fail to mate and thus reproduction is prevented. If the organism becomes habituated to the predator, the predator can more easily locate and attack the organism.

In yet another embodiment, the target organism is exposed to the noise of the organism's natural predators or competitors, causing the organism to react. The typical reaction is for the organism to attempt to flee from the noise, but if the noise is essentially directionless and surrounding the organism, it will move around without knowing how to flee away from the noise. Exposing the organism to the sound of predators or competitors causes them to increase the amount of movement, which tends to have negative effects on the organism. In other words, the organism expends energy in futile attempts to escape the predatory or competitory noise, making it less able to perform other necessary life activities such as feeding, mating, caring for young, etc. The organism may be too fatigued to perform those other necessary life activity behaviors, or may simply not have sufficient time to perform them because it is busy moving around in its attempt to escape the predatory noise.

In still yet another embodiment of the invention, the device is used to cause individual organisms in the colony to attack and maim, even kill, other individuals in the colony. For example, the device may be used to generate male mating attraction noises that are stronger or louder than normal; exposing a mating couple (or a couple about to mate) to these noises has been found to cause the male to attack the female, and in some instances devour the female.

In other embodiments, when the device is used to generate male mating attraction noises that are stronger or louder than normal, the female may reject the male and travel towards the speaker (where the noise is projected from); the female may then try to mate with the speaker.

In an exemplary embodiment of the invention, the natural male mating (attracting) call of the Western Pine Beetle was reproduced and played over and over. This caused aberrant behavior on the part of the beetles. More specifically, the male beetles kept guarding the entrance to the nest, and the female beetles tunneled through the wood toward the speakers through which the attracting call was played, in what appeared to be an attempt to approach what the female beetles thought were male beetles seeking to mate.

In still yet other embodiments, the normal tunneling behavior of the organisms is disrupted when the device of the invention is used. For example, the device may cause the organisms to block off the entry to the tunnel, preventing or otherwise disrupting other colony members from entering or leaving the tree or moving around within the tree. Another type of behavior that may be affected is preventing or otherwise disrupting the organism's normal behavior of cleaning the tunnels, which often precedes the laying of eggs. Yet another type of tunneling behavior that is affected is causing the organisms to make shorter tunnels than normal.

In most cases, the variety of "natural" noises to which the organisms are exposed will be generated as digital audio samples that are controlled and manipulated by a dedicated digital software application. This software application has the capacity to select and combine different audio samples, perform a variety of signal processing functions upon these samples, and to control their timing, rate of repetition, and playback amplitude.

In other embodiments of the invention, these "natural" noises can also be implemented as digital or analog audio samples stored in "hardware" form within pre-programmed electronic integrated circuits (e.g., EPROM chips).

The synthetic chaotic sounds used in the invention may be generated by a set of non-linear chaotic oscillators and ancillary systems capable of generating an infinite variety of "auditory behaviors" emergent from their status as autonomous electronic systems. The circuits produce an infinite assortment of complex noises and tones that exhibit repetitive action at a local level but tremendous global diversity over extended time periods. In this sense the circuits resemble the closed nervous systems of living entities that are under constant perturbation from other similar closed nervous systems. The intention is not to simulate the high level functioning of biological organisms and their cognitive capacities but rather to take this issue down to its most primary level of autonomous-closure machines where self-organization is more obviously inseparable from behavior.

Ultimately the emergent complexity of these systems results from the dynamical attributes of coupled chaotic attractors interacting in a high dimensional phase space. The control of circuit parameters determines a range of instabilities and structural couplings between nested chaotic circuits, allowing these autonomous behaviors to emerge.

Figure 2:
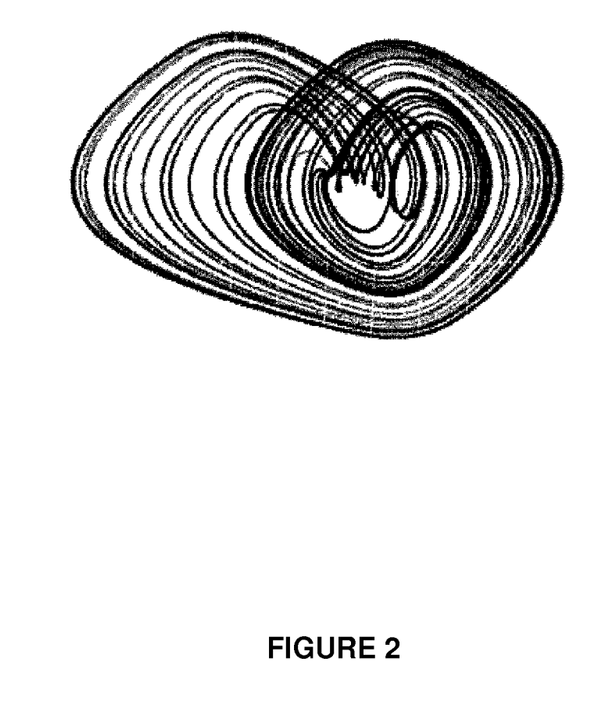
FIG. 2 is a visual representation of a certain chaotic sound produced and used in an embodiment of the invention.

The chaotic oscillator circuits used to create the chaotic waveforms yield the following double-scroll attractor, as illustrated here. FIG. 2 provides a visual representation of a certain sound produced over a certain period of time.

Figure 3:
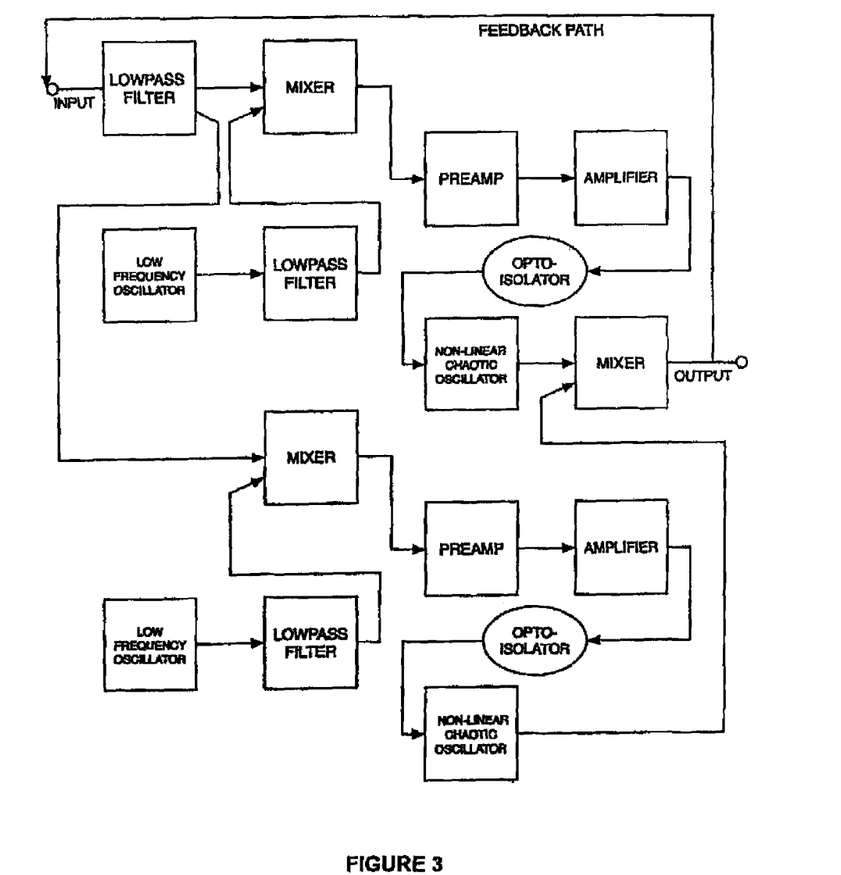
FIG. 3 is a flowchart illustrating one of two primary analog units used in an embodiment of the invention.
Figure 4:
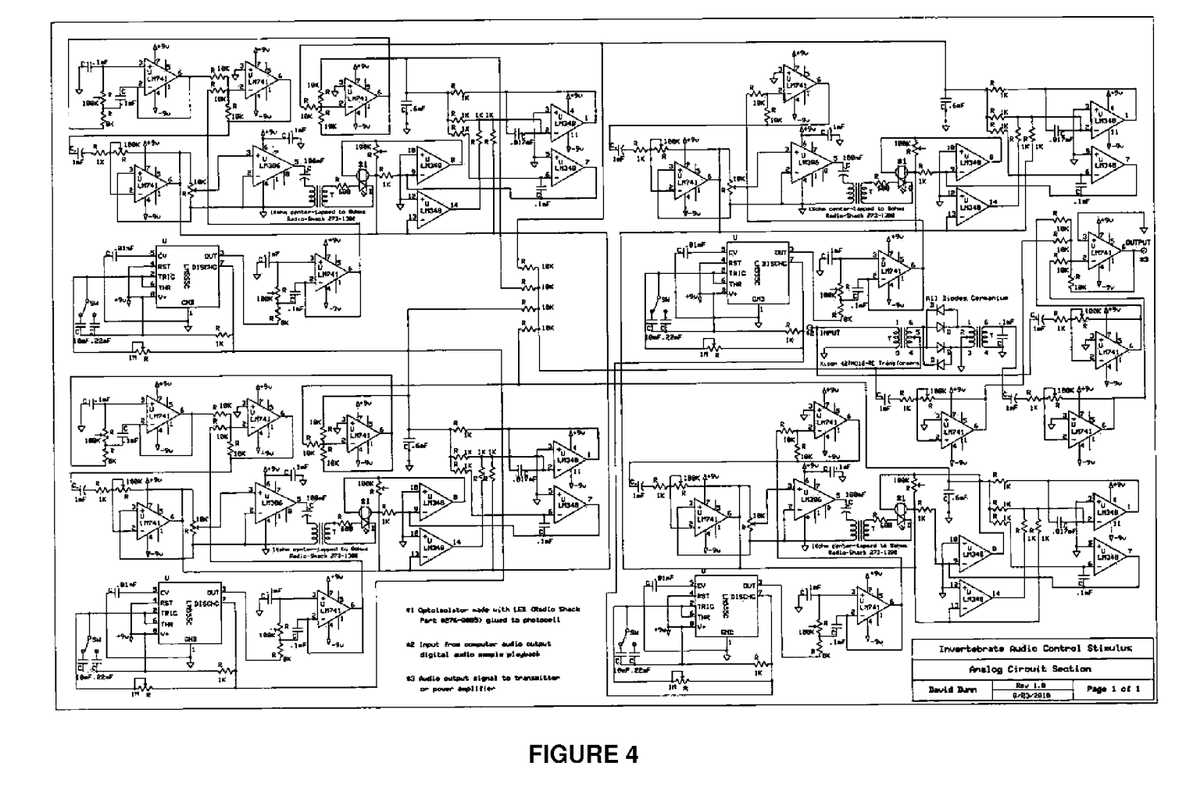
FIG. 4 illustrates a schematic diagram of a circuit used in an embodiment of the invention.

FIG. 3 is a flowchart of one of two primary analog electronic units and FIG. 4 is its schematic circuit diagram. These units are linked together through a resistance and feedback network as shown below. LPF=low pass filter; LFO=low frequency oscillator; PREAMP=preamplifier; NCO=nonlinear chaotic oscillator; VACTROL=optoisolator; AMP=amplifier. The circuit diagram depicts a functioning prototype of one embodiment of the non-linear chaotic oscillator circuit system.

The device according to a preferred embodiment of the invention comprises the following four parts: Three of these must be capable of emitting a broad range of frequencies (e.g., about 50 Hz to about 80 kHz): an audio transducer; an amplifier to drive the transducer; and a sound generator/processor. The fourth item is a power source (e.g., battery, generator or other means).

The invention also contemplates the use of ultrasonic and infrasonic frequencies outside the ranges disclosed herein.

The sound generator/processor consists of several components: a network of analog chaotic oscillators, digital coding and other synthetic and/or biologically relevant sound patterns and tones.

There are many distinct sub-circuits that make up a preferred embodiment of the complete system according to the invention, as follows:
4 nonlinear chaotic oscillators
4 low frequency oscillators
6 low pass filters
4 line preamps
4 line amplifiers
6 multi-channel mixers
4 opto-isolators
1 balanced amplitude modulator (ring modulator)
2 voltage regulators The nonlinear chaotic oscillators are capable of increasing and decreasing frequency, amplitude, duration, and can also vary the rate of change. Nonlinear chaotic oscillators are preferred in the invention, because they provide the ability to generate more dynamic sounds, such as sounds that change more unpredictably and more rapidly. It is possible also to use a linear chaotic oscillator, but it will not provide the ideal dynamic sound generation.

At least two oscillators are needed to be used in the invention, but in a preferred embodiment four oscillators are used.

It is preferred that the low pass filters are used, but they are not necessary.

As noted above, potential applications for the device and method of the invention include, but are not limited to, the elimination and/or prevention of infestations of wood-infesting organisms in and around private properties, nurseries and municipal parks.

What is claimed is:

1. A method for disrupting a physiological process and/or a normal behavior of a wood-inhabiting invertebrate subject comprising:
   (a) selecting one or more of the following signals:
      (i) a biological acoustic waveform sample or portion thereof,
      (ii) a re-synthesized biological acoustic waveform sample or portion thereof,
      (iii) a processed biological acoustic waveform sample or portion thereof,
      (iv) a processed, re-synthesized biological acoustic waveform sample or portion thereof; and
   (b) exposing the subject to a combined signal of the one or more of the signals selected in step (a) and one or more chaotic acoustic waveforms.

2. The method of claim 1, wherein the processed biological acoustic waveform sample or portion thereof and the processed, re-synthesized biological acoustic waveform sample or portion thereof are produced by processing a biological acoustic waveform sample or portion thereof or a re-synthesized biological acoustic waveform or portion thereof, in time domain, frequency domain or both time and frequency domains.

3. The method of claim 1, wherein step (a) further comprises selecting two or more signals and a combination of the two or more signals is produced using an analog audio selector and mixer.

4. The method of claim 1, wherein step (b) further comprises exposing the subject when the subject is within the tissue of a living tree or is in proximity to a living tree.

5. The method of claim 4, wherein in step (b) the insect subject within the living tissue is in its larval stage, or the insect subject in proximity to the living tree is in its flying stage.

6. The method of claim 1, wherein the chaotic waveforms are in analog form, the biological acoustic waveform sample or portion thereof, the re-synthesized biological acoustic waveform sample or portion thereof, the processed biological acoustic waveform sample, and the processed re-synthesized biological acoustic waveform sample are each in digital form, and one or more of the foregoing are combined via an analog audio selector and mixer.

7. The method of claim 4, further comprising placing an acoustic transducer in contact with the phloem or xylem of the living tree.

8. The method of claim 7, further comprising:
(i) removing a portion of outer bark of the living tree;
(ii) inserting in place of the portion a sound-transmissible element;
(iii) attaching the acoustic transducer to the sound-transmissible element; and
(iv) transmitting the combined signal to the acoustic transducer, thereby exposing the insect subject to the combined signal.

9. The method of claim 1, wherein the biological waveform sample or portion thereof is selected from group consisting of: mating calls, territorial signals, species recognition sounds, aggression sounds, and feeding sounds.

10. The method of claim 1, wherein the physiological process and/or normal behavior is selected from the group consisting of: directional guidance, feeding, colonization, tunneling, communication, organization, reproduction, nest building, competitive interactions, predator avoidance, mate attraction, mating, caring for eggs and caring for offspring.

11. The method of claim 1, wherein step (b) further comprises exposing the subject when the subject is within the tissue of a wooden object or is in proximity to a wooden object or material or object having at least a portion composed of wood by placing a sound transducer in contact with the object or material.

12. The method of claim 11, wherein the wooden object is a wine barrel.

13. The method of claim 11, wherein the wooden object is a man-made building structure or a dead tree.

14. The method of claim 1, wherein step (b) further comprises exposing the subject when the subject is within the tissue of a wooden object or is in proximity to a wooden object or material or object having at least a portion composed of wood by placing a sound transducer in contact with a sound-transmissible substrate, wherein the substrate is in contact with the object or material.

15. The method of claim 14, wherein the sound-transmissible substrate is selected from the group consisting of water, dirt, sand, air or ice.

16. The method of claim 1, wherein the subject is an insect selected from the group consisting of Mountain Pine Beetle, Emerald Ash Borer and Asian Longhorn Beetle.

17. The method of claim 5, wherein the subject is an insect selected from the group consisting of Mountain Pine Beetle, Emerald Ash Borer and Asian Longhorn Beetle.

18. A device for preventing or controlling an insect subject from destroying a living tree or wooden object, comprising:
(a) a sound generator comprising at least two chaotic oscillators;
(b) an amplifier; and
(c) a transducer.

19. The device of claim 18, further comprising a power source.

20. The device of claim 18, wherein the sound generator, amplifier and transducer are in wireless communication with one another.

21. The device of claim 18, wherein the transducer is a loudspeaker.

22. The device of claim 18, wherein the transducer is tactile transducer.

23. A method for re-directing an infestation of wood-inhabiting invertebrates in a treed area, comprising placing a device according to claim 19 on each of multiple trees along the edge of the treed area that is infested with the invertebrates, and operating the devices to expose the invertebrates to the signals produced by the devices.

24. The method of claim 1, wherein the one or more chaotic acoustic waveforms are non-linear chaotic acoustic waveforms.

25. The method of claim 1, wherein the one or more chaotic acoustic waveforms are generated from the signal or signals selected in step (a).

26. A method for disrupting a physiological process and/or a normal behavior of a wood-inhabiting invertebrate subject comprising:
(a) selecting one or more of the following signals:
(i) a biological acoustic waveform sample or portion thereof,
(ii) a re-synthesized biological acoustic waveform sample or portion thereof,
(iii) a processed biological acoustic waveform sample or portion thereof, or
(iv) a processed, re-synthesized biological acoustic waveform sample or portion thereof;
(b) generating one or more chaotic waveforms from the one or more signals selected in step (a); and
(c) exposing the subject to the one or more chaotic waveforms.

27. The device of claim 18, wherein the chaotic oscillators are non-linear chaotic oscillators.

* * * * *